T. D. WARNER.
ELECTRICALLY OPERATED WARNING SIGNAL MEANS FOR GARAGES.
APPLICATION FILED MAR. 18, 1915.
1,172,084.
Patented Feb. 15, 1916.
2 SHEETS—SHEET 2.
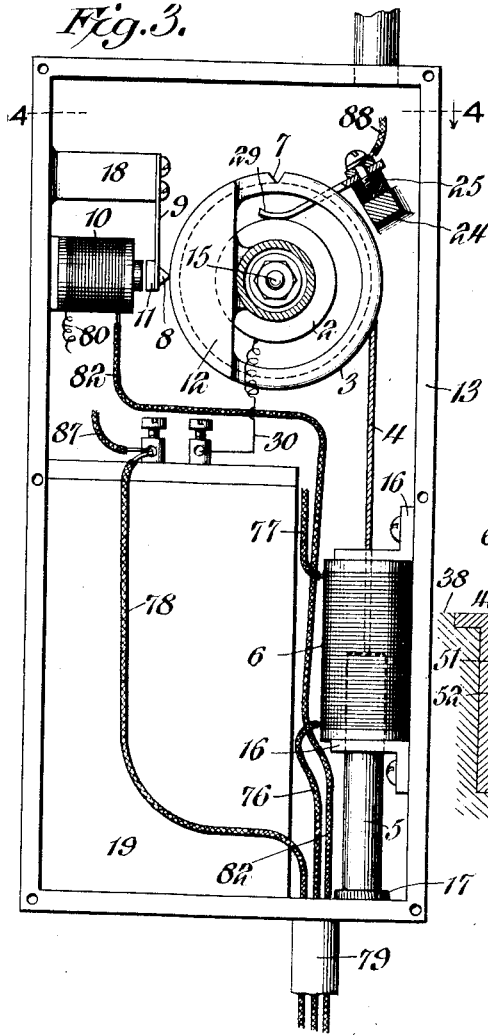
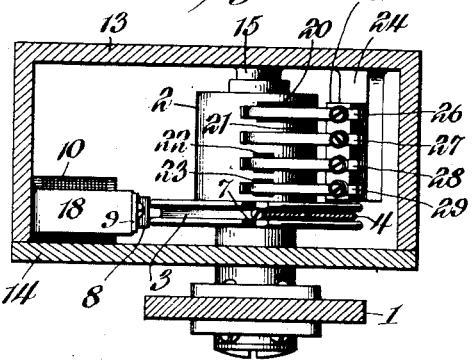
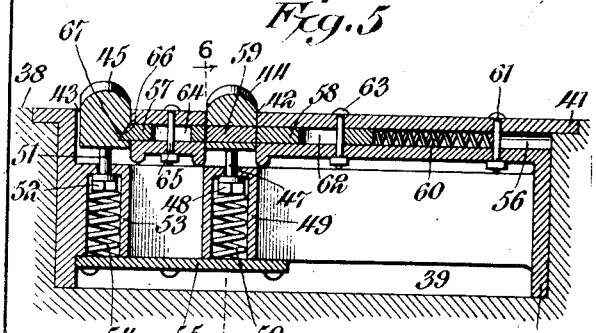
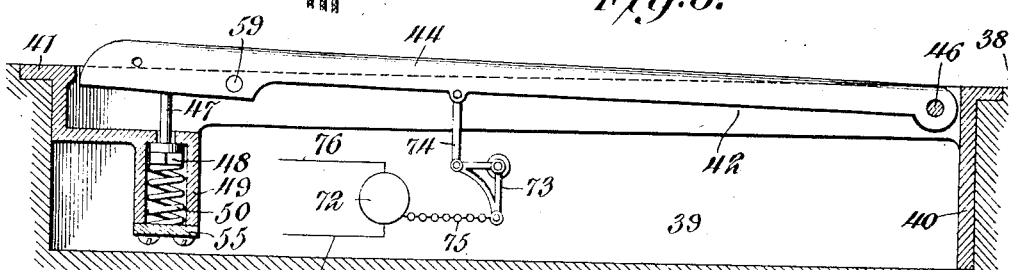
WITNESSES
Howard D. Orr.
F. T. Chapman
Thomas D. Warner, INVENTOR,
BY E. G. Siggers
ATTORNEY

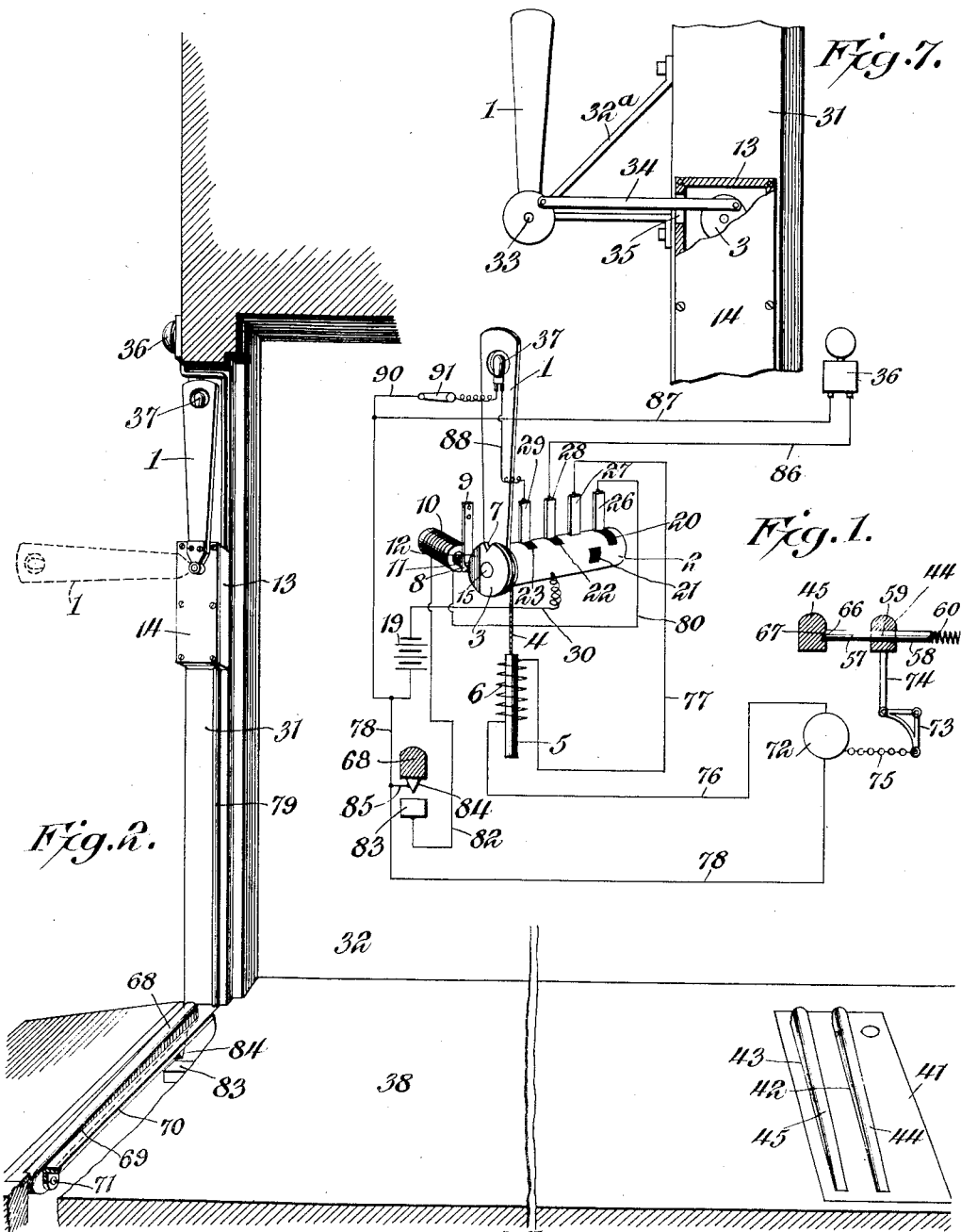

UNITED STATES PATENT OFFICE.

THOMAS D. WARNER, OF JONESBORO, ARKANSAS.

ELECTRICALLY-OPERATED WARNING-SIGNAL MEANS FOR GARAGES.

1,172,084.  Specification of Letters Patent.  Patented Feb. 15, 1916.

Application filed March 18, 1915. Serial No. 15,384.

*To all whom it may concern:*

Be it known that I, THOMAS D. WARNER, a citizen of the United States, residing at Jonesboro, in the county of Craighead and State of Arkansas, have invented a new and useful Electrically-Operated Warning-Signal Means for Garages, of which the following is a specification.

This invention has reference to electrically operated warning signal means for garages, and its object is to provide an automatically actuated signal means which is set at the danger or warning position in the event of an automobile contained within the garage approaching the door or outlet to emerge therefrom. The signal is put into the warning condition whether the automobile continues its movement to and through the door, or for some reason stops on its way out.

Many garages, and especially those where automobiles are stored and repaired are so located with respect to a street or highway that emerging automobiles may be dangerous to passers-by, so that a suitable warning of the impending emergence of the automobile from the garage will result in avoidance of accidents.

The warning means may be in any form which is generally recognized as an indication of danger, and such a warning means, which is usually of a visual nature, may be, and preferably is, accompanied by audible means, so as to attract attention to the visible means, whereby any one approaching the garage door has ample warning that an automobile is about to leave the garage. Even should a person be opposite the doorway when the danger warning is first given the display of the warning and the sounding of the alarm start at a sufficiently long time interval before the automobile actually reaches the doorway that the pedestrian or other person has ample opportunity to move out of the danger area.

In the event of an automobile entering the garage its approach is readily seen, and there is ample warning thereof so that there is no necessity of a warning signal means in such case. For this reason the warning signal means of the present invention is so constructed and arranged as to remain inert on the entrance of an automobile into the garage, but it becomes active should an automobile within the garage move toward the doorway to emerge therefrom. For this reason the warning signal means of the present invention becomes a one-way warning means.

In accordance with the present invention the warning signal means may be in large measure electrically actuated, the power employed being electrical and aside from certain mechanisms actuated by a passing automobile and certain other parts of the structure, the entire device is of an electrical nature.

The present invention includes certain devices in the path of an automobile emerging from the garage, which devices are responsive to the passing automobile to cause the closure of electric circuits. The visual warning signal is customarily in the form of a semaphore, such being a well recognized signal means, while the audible signal means may be in the form of an electric bell, which is preferably, although not necessarily, of the intermittent type, because an intermittent stroke electric bell is more obtrusively noticeable than one of the continuously ringing type.

Provision is made for the locking of the signal means in the danger indicating position or condition with the cutting out of the initially operated means receiving its power from a source of electric current whereby a saving in electric current is effected.

By placing the means responsive to the passing automobile for the setting of the signal at a sufficient distance from the door within the garage, the traveling vehicle causes a setting of the signal at an ample time before the automobile can reach the doorway, so that a passer-by receives sufficient warning. Since there is no need of continuing the signal after the automobile becomes visible, provision is made for the emerging automobile after having passed part way through the door to cause the resetting of the signal means to the safety position and the hushing of the bell or other audible signal means.

Because there is no need of setting the signal with respect to an entering automobile, provision is made whereby the entering automobile locks that means responsive to the passing automobile which causes the setting of the signal against operation.

All the operations described are entirely automatic and the signal is particularly valuable where the garage is situated on a busy street and many automobiles pass into and out of it.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a diagram illustrating the present invention. Fig. 2 is a perspective view of a signal equipment as applied to the door end of a garage, a portion only of the latter being shown. Fig. 3 is an elevation with some parts removed and other parts in section of the electrically operated mechanism controlling the movement of the visual signal into and out of active position. Fig. 4 is a section on the line 4—4 of Fig. 3. Fig. 5 is a cross-section of a floor-installed structure responsive to a passing automobile and arranged to control the electrically operated signal devices. Fig. 6 is a section on the line 6—6 of Fig. 5. Fig. 7 is an elevation with some parts in section of a modified arrangement of the visual signal means.

Referring to the drawings there is shown a semaphore 1 carried by a hub 2, which latter also carries a pulley 3 to which is attached a cord or other flexible strand 4 carrying a core 5 of a solenoid 6. The pulley 3 is shown as provided at one point with a peripheral notch 7 in the path of which is a tooth 8 carried by a support 9 shown as in the form of a spring which is assumed to have a tendency to cause the tooth 8 to enter the notch 7. In the normal condition of the parts the notch 7 is removed from the tooth 8 by about ninety degrees, so that a quarter turn of the hub 2 will bring the notch 7 into coincidence with the tooth 8 and the latter is then moved into the notch by the tendency of the spring 9. The tooth 8 is under the control of an electro-magnet 10 in position to act upon an armature 11 carried by the spring 9 in such manner that when the magnet 10 is energized the armature 11 is attracted sufficiently to move the tooth 8 out of the notch 7 if then lodged in such notch.

The semaphore 1 in its normal condition is upright, this being a recognized position of safety. However, the hub 2 and the semaphore carried thereby is then under the constant action of a counterweight 12 which may be carried by or form part of the pulley 3, or may be arranged in any other way. This counterweight is designed to move the semaphore to the danger position, but the core 5 of the solenoid 6 is arranged to counteract the counterweight and to overbalance it, wherefore in the normal position of the parts the counterweight is lifted until to reach the position to which it will move under the action of gravity it must traverse an arc of about ninety degrees. This movement of the semaphore arm under the action of the counterweight 12 is brought about by the energization of the solenoid 6, which has the effect of lifting the core 5 into it and the parts are so proportioned that when the solenoid 6 is energized and the core 5 is lifted the counterweight 12 will gravitate to the pendent position and thereby move the semaphore from its normal upright position to a danger indicating horizontal position, in which latter position the notch 7 is brought into coincidence with the tooth 8 and the latter snaps into the notch under the action of the spring 9, and thereby locks the semaphore in the horizontal or danger position. When this point is reached the solenoid 6 may be deënergized, and although the core 5 sufficiently overbalances the semaphore arm and the counterweight 12 to return the semaphore arm to the upright position, the tooth 8 prevents such movement, wherefore it serves the function of a latch or lock. When, however, the magnet 10 is energized the tooth 8 is pulled out of the notch 7 and then the overweight of the core 5 causes a return of the parts to their initial position with the counterweight 12 lifted and the semaphore arm in the upright position where it is held by the core 5.

When the present invention is installed in a building in the course of the erection of the building, many of the parts may be housed in suitable portions of the building, but when the present invention is applied to a building already erected it becomes necessary to provide suitable protection and support for various parts without necessitating any material change in the erected building. For this reason a box or casing 13 is provided, and this box or casing is supplied with a removable cover 14, whereby access to the interior of the casing is readily obtained, and the contents of the casing are suitably protected. In this casing the hub 2 is mounted on a suitable spindle 15 and projects through and beyond the front of the cover 14, at which latter point the semaphore arm 1 is made fast to the hub in any suitable manner.

Of course, it will be understood that the hub 2 may be mounted upon a spindle 5 by suitable ball bearing journals, but these are features which do not particularly enter into the present invention, and hence need not be shown nor described.

The solenoid 6 is mounted within the casing 13 by means of suitable brackets 16, or in any other appropriate manner, and the solenoid is so situated that the core 5 may when in the lowered position rest upon a buffer block 17 within the casing on the bottom thereof, such buffer block acting both as a stop and as a means for preventing noise.

The magnet 10 is made fast to one side of the casing at an appropriate position, and the spring 9 is made fast to a lug 18 projecting from the same side of the casing, the lug either being cast on the inner wall of the side of the casing, or made fast thereto in any appropriate manner.

The casing may be of sufficient size to contain a battery indicated at 19, and this battery may be a storage battery, or a primary battery. As it is quite customary in well equipped garages to have means for charging storage batteries, it is preferred under such conditions to have the battery 19 of such type. However, the solenoid 6 and magnet 10 may be readily wound for street current, in which case the battery 19 is discarded and street current is employed in a suitable manner for energizing the solenoid and magnet.

The hub 2 is provided at suitable points with sections 20, 21, 22 and 23, it being assumed that the hub itself is made of metal so as to be conducting.

Projecting from the back of the casing is a lug 24 which may be arranged in parallelism with the axis of the hub 2. Carried by the lug 24 is a block 25 of insulating material in turn carrying brushes 26, 27, 28 and 29, four such brushes being usually sufficient for the purposes of the invention. The insulating strip 20 normally separates the brush 26 from contact with the hub 2, but is shortened sufficiently to cause the brush 20 to contact with the hub 2 when the notch 7 has reached the tooth 8. The brush 27 is normally in contact with the hub 2 and the insulating block or strip 21 is so situated in the hub 2 with relation to the brush 27 as to be engaged by the brush to insulate the latter from the hub when the hub has been moved to carry the semaphore to the horizontal or danger position.

The two insulating strips or blocks 22 and 23 normally separates the brushes 28 and 29 from electrical contact with the hub 2, but these insulating blocks are made short so that as soon as the hub begins to turn to carry the semaphore arm toward the danger position the brushes 28 and 29 contact with the hub and remain in such position until the hub again returns to its first or normal position.

One side of the battery 19 is connected by a conductor 30 to the hub 2 and while such connection may be made by means of a brush, the movement of the hub which need not exceed an arc of ninety degrees, is not so great but that a conductor may where leading to the hub be of a sufficiently flexible nature to accommodate itself to the movements of the hub, thereby avoiding the necessity of an additional brush.

The box or casing 13 is usually mounted upon one side casing of a doorway 31 constituting the entering and exit doorway or passage of a garage, a small portion of which latter is shown at 32 in Fig. 2. By this means the semaphore arm 1 is normally more or less hidden by the doorway, since it may be located within such doorway to be moved therefrom outwardly into sight. Sometimes it is advisable to have the semaphore arm more prominently displayed at some little distance from the wall of the garage, in which case a bracket 32$^a$ is made fast to the wall of the garage and carries the semaphore arm 1 mounted on a journal 33 at the outer extremity of the bracket 32 and connected by a link 34 to a suitable point on the pulley 3 to cause a participation by the arm 1 in the movements of the pulley. In such case a passage 35 is produced through one side wall of the casing 13 for the link 34. The arrangement of the semaphore arm just described is shown separately in Fig. 7.

It is advisable to associate an audible alarm with the visual signal represented by the semaphore 1 and for this purpose there is provided an electric bell 36 preferably, though not necessarily, of the intermittent stroke type, and this bell may be located above the doorway or opening 31, or may be located at any convenient point so that the sounding of the bell will attract attention toward the semaphore or other visual signal employed. In order that the semaphore may be readily seen at night it may be provided with an electric lamp 37.

Garages are, of course, provided with suitable floors, such, for instance, as indicated at 38 in Fig. 2. Such floor may be a wooden floor or a cement floor and the showing of the drawings may be taken as indicating a cement floor.

Within the garage at a suitable distance from the door opening 31 there is provided a shallow pit 39 in which is lodged a frame or casing 40 provided with a top plate 41 arranged flush with the top surface of the floor 38. The plate 41 is arranged traversely of the line of travel along the floor 38 toward or from the door opening 31, and the distance of the plate 41 from the door opening will depend upon the circumstances to be met. Such distance is great enough to provide ample time for the display of a warning before an automobile traveling across the plate 41 toward the door opening 31 will reach the latter and emerge from the garage. Ordinarily if the distance between the plate 41 and the door opening 31 is about, or a little more than the length of the wheel base of the automobile, the time interval will be found to be sufficient, since an automobile usually travels at a relatively slow rate of speed in passing out of the garage.

The plate 41 is formed with two elongated slots 42, 43 extending through the plate and arranged transversely of the line of travel of an automobile into and out of the garage, wherefore since the plate 41 is elongated in the same direction as the slots 43, the latter are longitudinal of the plate and, furthermore, are arranged parallel one to the other nearer one edge of the plate than the other. Extending lengthwise of the channels 42 and 43 are bars 44, 45, respectively, each by preference having a rounded upper edge. Each bar at one end of the slot in which it is lodged is secured to the casing 40 by a pivot bolt 46, only one such pivot bolt being shown in the drawings, since the two bars 44 and 45 are alike in this respect. The bar 44 near the end remote from the pivot 46 carries a pin 47 having a head 48 within a spring casing 49 containing a spring 50. The bar 45 has a like pin 51 provided with a head 52 within a spring casing 53 containing a spring 54. Both casings 49 and 53 are closed at the ends remote from the bars by a removable plate 55, so that access to the springs is readily obtainable. The springs 50 and 54 engage the respective heads 48 and 52 and maintain the corresponding ends of the bars 44 and 45 elevated above the top of the plate 41, the extent of elevation being limited by the engagement of the heads 48 and 52 with the upper ends of the respective spring casings 49 and 53.

Extending underneath the plate 41 transversely of the length of the plate and of the bars 44 and 45 is a channel 56 containing lock bolts 57 and 58 on opposite sides of the bar 44, and the latter contains another lock bolt 59 in normal alinement with the lock bolts 57 and 58, and of a length equal to the thickness of the bar 44. The bolt 58 is engaged on the end remote from the bar 44 by one end of a spring 60, which spring is lodged in the channel 56, and has its other end engaged against a stop pin 61 traversing the channel. The bolt 58 is formed with a transverse slot 62 traversed by a stop pin 63 extending across the channel 56. The bolt 57 is provided with a transverse slot 64 traversed by a stop pin 65 extending across the channel 56. That end of the bolt 57 remote from the bar 44 terminates in a bevel 66 entering a correspondingly beveled notch 67 in the corresponding side of the bar 45 when the parts are all in the normal or inactive position.

The springs 50 and 54 are sufficiently strong to uphold the bars 44 and 45 against weights liable to come into contact with them, but which weights are considerably less than that of an automobile. The springs are arranged so as not to yield at all to the weight of a human being, but an ordinary automobile upon moving across the bars 44 and 45, or either of them will cause a yielding of the spring or springs. Moreover, the bars 44 and 45 are close enough together so that both are engaged at one time by the tire of an automobile wheel passing over them.

If an automobile rides first over the bar 44 the spring 50 yields and the bar is pressed down into the slot or channel 42 in the plate 41, so that the top of the bar is then about flush with the top of the plate. This causes a movement of the bolt 59 out of alinement with either bolt 57 or 58, and then when the automobile wheels pass from the bar 44 on to the bar 45, the latter cannot yield because the bolt 57 cannot move, since it then abuts against the side face of the bar 44 and the bevel end 66 of the bolt is lodged in the beveled notch 67 of the bar 45.

Should it happen that the bar 45 is the one to be first engaged, it is depressed against the action of the spring 54, thus causing the bevel wall of the notch 67 to thrust the bolt 57 toward the bar 44 to in turn move the bolt 59 correspondingly through the bar 44 and impart a like movement to the bolt 58, the spring 60 yielding to such movements. The bar 45 being depressed brings a plane surface in the path of the beveled end of the bolt 57, so that the latter is then held in the new position. The other end of the bolt 57 has entered the bar 44 and the bolt 59 has entered the passage 56 on the corresponding side of the bar 44. This effectively locks the bar 44 in the raised position and no amount of force applied to the top of the bar and which is not destructive to the bar or to the bolts can cause a depression of the bar 44.

Another similar bar 68 is lodged in a like slot or channel 69 in a plate 70 sunk in the floor 38 coincident with the door opening 31, or in close relation thereto. The bar 68 is supported at one end by a pivot 71 and at the other end may be supported by a spring like either of the bars 44 or 45, so that the bar 68 at the end remote from the pivot 71 is in normal projecting relation to the upper surface of the plate 70, but will yield to a passing automobile like either of the bars 44 or 45.

Within the pit 39 there is mounted an electric switch 72 connected to the bar 44 in a manner to cause the operation of the switch first to the on position and then to the off position by successive depressions of the bar 44. In the drawings a simple form of mechanism for the purpose is illustrated. There is provided a bell crank lever 13

73 suitably mounted within the pit 39 and on one side connected by a link 74 to the bar 44, while the other side of the bell crank lever is connected by a chain or other flexible connection 75 to the switch 72, it being assumed that the latter is of a character whereby a pull on the chain 75 closes the switch and a release of the chain permits the switch operating mechanism to assume the first position and the second pull on the chain causes the switch to open while a second release of the chain again returns the switch operating mechanism to the first position. Of course, it will be understood that the showing of the switch 72 and the mechanism for operating it is largely indicative, and is not intended to confine the invention to the use of any particular type of circuit controlling mechanism for the purpose.

One side of the switch 72 is connected by a conductor 76 to one side of the winding of the solenoid 6, while the other side of this solenoid is connected by a conductor 77 to the brush 27. The other side of the switch 72 is connected by a conductor 78 to that side of the battery 19 remote from the conductor 30. The conductors 76 and 78 are preferably carried through a conduit 79 which may rise from the floor 38 and may be carried under the floor to the pit 39. Above the floor the conduit 79 is continued to the lower end of the box 13, so that the conductors extending to the battery and to the solenoid and other conductors are amply protected against harm. The conduit 79 may be of the character usually employed in electrical installations.

One side of the magnet 10 within the box 13 is connected by a conductor 80 to the brush 26. The other side of the winding of the magnet 10 is connected by a conductor 82 which may be carried through the conduit 79 to a contact 83 in the path of another contact 84 which latter is carried by the bar 68. The contacts 83 and 84 are normally out of engagement, but in the passage of an automobile over the bar 68, which latter is located in the path of automobiles emerging from and entering the garage, the depression of the bar 68 by reason of the weight of the automobile causes the contact 84 to engage the contact 83. The contact 84 is connected to the battery 19 by a branch conductor 85 which may be connected at a convenient point to the conductor 78.

One side of the bell 36 is connected by a conductor 86 to the brush 28 and the other side of the bell 36 is connected by a conductor 87 to the battery 19 either directly or by a portion of the conductor 78.

The lamp 37 is connected on one side by a conductor 88 to the brush 29 and on the other side by a conductor 90 to the conductor 87, which ultimately reaches the battery 19 or may be connected to the battery in any other suitable way. The conductor 90 includes a switch 91 by means of which the lamp 37 may be included in the circuit at night and cut out of the circuit in the day time when it is not needed.

With an arrangement such as hereinbefore described, it may be assumed that there is an automobile within the garage about to emerge therefrom. Such an automobile upon approaching the doorway 31 first moves over the bar 44, which latter yields to the weight of the automobile and is depressed to about the level of the top of the plate 41. This movement causes an actuation of the switch 72 to close the circuit controlled thereby. This circuit may be traced from the battery 19 by way of the conductor 78 to the switch 72, and from the latter by way of the conductor 79 to the coil of the solenoid 6, and thence by way of the conductor 77 to the brush 27, returning to the battery by way of the hub 2 and conductor 30. The solenoid 6 is therefore energized and lifts the core 5, thereby neutralizing the weight of the core and its effect upon the semaphore to hold it in the upright position, whereupon the counterweight 12 becomes active to cause a turning of the hub until the semaphore arm 1 reaches the horizontal position, the tooth 8 then entering the notch 7 and causing a locking of the semaphore arm in the danger position. Just as this occurs the insulating strip or block 21 breaks the continuity of the circuit of the solenoid 6 at the brush 27. The core which would ordinarily then drop is prevented from so doing by the locking action of the tooth 8 in the notch 7. In the meantime the movement of the hub 2 has carried the insulating strip or block 20 from underneath the brush 26, so that the latter is then in electrical contact with the hub 2 and when the hub 2 began to move the insulating blocks or strips 22 and 23 were moved from beneath the brushes 28 and 29 and the latter were at once brought into electrical contact with the hub 2 at about the beginning of its rotation. The result of this is that there is then established a circuit from the battery 19 by way of the conductor 30 to the hub 2, thence by the brush 28 and conductor 86 to one side of the bell 36, the circuit being completed through the conductors 87 and 78 or directly by the conductor 87 to the other side of the battery 19. The bell 36 being thereby energized begins and continues to ring so long as the semaphore arm remains in the danger position. If it be assumed that the switch 91 is closed there is also established a circuit from the battery 19 by way of the conductor 30 to the hub 2, thence by the brush 29 and conductor 88 to one side of the lamp 37, thence by the switch 91 and conductor 90 to the conductor 87 and by way of the latter to the other side of the battery 19. This causes the lamp 37 to glow and it being assumed that this lamp is arranged to cause a red light the danger indication is thereby exhibited. The lamp is only needed at night time, and it is only at night time that the switch 91 is closed, so that in day time when the switch 91 is open the closing of the circuit at the brush 29 is ineffective since the circuit is broken at the switch 91.

As before explained, the outward movement of the automobile from the garage does not effect the bar 45 since this bar has been locked in the elevated position by the depression of the bar 44.

Ultimately the emerging automobile reaches the bar 68, and the latter is depressed, thus bringing the contact 84 into engagement with the contact 83. There is now established a circuit from the battery 19 through the conductor 30 to the hub 2, thence by way of the brush 26 and conductor 80 to one side of the magnet 10, returning to the battery by way of the conductor 82, contacts 83 and 84, conductor 85 and conductor 78. The energization of the magnet 10 causes an attraction of the armature 11 with sufficient force to move the tooth 8 out of the notch 7, whereupon the core 5 becomes effective in overbalancing the counterweight 12 and the weight of the semaphore arm and the fall of the core 5 causes a rotation of the hub 2 in a direction to elevate the semaphore arm to the safety position. The return of the hub 2 to normal position restores the coil of the semaphore 6 into the circuit so far as the brush 27 and hub 2 are concerned. The rotation of the hub also causes the brush 21 to be underridden by the insulating strip 20 and the brushes 28 and 29 be similarly underridden by the insulating sections 22 and 23. The interruption of the circuit at the brush 28 stills the bell 36 and the interruption of the circuit at the brush 29 cuts out the lamp 37 if it be assumed that the switch 91 is closed. The parts are now all restored to normal position, this restoration beginning with the passage over the bar 68 of those wheels of the automobile first reaching the doorway. If the automobile be moving slowly the parts have time to become restored to normal condition before the other set of wheels of the automobile reach the bar 68. In this event, however, the closure of the circuit at the contacts 83 and 84 is ineffective since the circuit is also broken at the brush 26.

The depression of the bar 44 by the first set of wheels of the automobile to reach it caused the movement of the semaphore arm 1 to the danger position and when the second set of wheels of the outgoing automobile reached the bar 44 the brush 27 connected up to the core of the solenoid 6 was then resting upon the insulating plate or strip 21, so that the second actuation of the bar 44 was ineffective to cause a second energization of the solenoid 6, although such second actuation would have been ineffective because the semaphore was already locked in its full actuated position.

Suppose that with the parts in the safety position an automobile enters the garage. This causes a depression of the bar 68, but since the circuit otherwise controlled by the contacts 83 and 84 is then broken at the brush 26 there is no electrical effect. When the incoming automobile reaches the bar 45 the latter is depressed thereby locking the bar 44 against response to the passing automobile as before explained, and since the bar 44 is then locked there is no electrical response to the incoming automobile.

While the invention has been described with special reference to garages and automobiles, it is in whole or in part useful in other connections, and while for convenience of description the terms garage and automobile are employed in the claims it is to be distinctly understood that such terms are not to be considered as limiting the invention to use in such particular connections.

The present application is limited to electrical means for the actuation and control of the signal means whether visual or audible, and the claims in this case are similarly limited, since the broader features of the invention are described and claimed in another application filed by me and entitled warning signal means for garages.

What is claimed is:—

1. A warning signal means for garages comprising a visual signal device, electrical operating means therefor responsive to the passage of an automobile in one direction, and means for preventing operation of the signal device on the passage of the automobile in the other direction.

2. A warning signal means for garages comprising signal instrumentalities movable into safety and danger indicating conditions, electrical operating means therefor responsive to the passage of an automobile in one direction, and mechanical means for preventing operation of the signal instrumentalities on the passage of the automobile in the other direction.

3. A warning signal means for garages comprising a visual signal device and audible signal means, electrical operating means for both the visual and audible devices and responsive to the passage of an automobile in one direction, and mechanical means for preventing operation of the signal means on the passage of the automobile in the other direction.

4. A warning signal means for garages comprising a signal device movable into safety and danger positions and located with respect to the garage to be observable when in the danger position by passers-by, electrical operating means for the signal means in part in spaced relation to the place of egress of the automobile from the garage and responsive to the passage of the automobile toward said place of egress to cause the actuation of the signal device to indicate danger, and other electrical means in part in the path of the automobile and responsive to the passage of the automobile from the garage for restoring the indicating device to a condition signifying safety.

5. A warning signal means for garages comprising a visual danger indicating means movable into and out of danger indicating position, electromechanical means responsive to the passage of an automobile in one direction for setting the indicating means to the danger position, and electromechanical means responsive to the passage of the automobile in the same direction for causing the restoration of the indicating means to the safety indicating position, the first-named means responsive to the passage of the automobile being spaced from the second named means responsive to the passage of the automobile in the direction of travel of the automobile to emerge from the garage.

6. A warning signal means for garages comprising visual danger indicating means movable into and out of danger indicating position, electromechanical means responsive to the passage of an automobile in a direction to emerge from the garage for setting the indicating means to the danger position, and electromechanical means responsive to the passage of the automobile in the same direction and closer to the place of egress than the first-named means for causing the restoration of the indicating means to the safety indicating position, the extent of spacing of the first-named means from the second-named means being greater than the length of the wheel base of the automobile.

7. A warning signal means for garages comprising associated visual and audible signal means, electromechanical means responsive to the passage of an automobile for causing the display of the visual means to a position indicating danger and the sounding of the audible means, and other electromechanical means responsive to the passage of the automobile subsequent to the actuation of the first-named means for restoring the visual means to safety indicating position and for hushing the audible means.

8. A warning signal means for garages comprising associated visual and audible signal means, electromechanical means responsive to the passage of an automobile for causing the display of the visual means to a position indicating danger and the sounding of the audible means, and other electromechanical means responsive to the passage of the automobile subsequent to the actuation of the first-named means for restoring the visual means to safety indicating position and for hushing the audible means, the second-named electromechanical means being located adjacent to the place of egress of the automobile from the garage, and the first-named electromechanical means being located within the garage at a distance from the second-named electromechanical means to cause the display of the danger signal before the automobile reaches the place of egress.

9. A warning signal means for garages comprising danger indicating means, electromechanical means in part in spaced relation to the place of egress for automobiles from the garage and responsive to the passage of an automobile toward said place of egress to set the danger indicating means into danger indicating condition, electromechanical means responsive to the passage of the automobile in the same direction as the first-mentioned means, and in part located adjacent to the place of egress from the garage for causing the restoration of the danger indicating means to safety indicating condition, and means for rendering both means responsive to the passage of an automobile inert to such passage when the automobile is entering the garage.

10. A warning signal means for garages comprising visual and audible danger indicating means, electromechanical means in part in spaced relation to the place of egress of automobiles from the garage and responsive to the passage of an automobile toward said place of egress to set the danger indicating means into danger indicating condition, electromechanical means responsive to the passage of an automobile in the same direction as first mentioned, and in part located adjacent to the place of egress of an automobile from the garage for causing the restoration of the other indicating means to the safety indicating condition, and means for rendering the electromechanical means inert to the passage of an automobile on entering the garage.

11. A warning signal means for garages comprising a semaphore arm and an electric bell, electromechanical means in part in spaced relation to the place of egress for automobiles from the garage and responsive to the passage of an automobile toward said place of egress to set the signal means in the danger indicating condition, electromechanical means responsive to the passage of the automobile in the same direction as first mentioned and in part located adjacent to the place of egress from the garage for causing the restoration of the danger indicating means to the safety indicating condition, and means for rendering the electromechanical means inert to the passage of an automobile entering the garage.

12. A warning signal means for garages, comprising danger indicating means, electric means for the danger indicating means for setting the latter in danger indicating condition, one-way means responsive to the passage of the automobile for causing the actuation of the electrical setting means, and electromechanical means responsive to the passage of an automobile for restoring the danger indicating means to safety condition.

13. A warning signal means for garages comprising danger indicating means having a normal safety position as to indications and capable of being set into danger indicating condition, mechanical means adapted to be located in the floor of the garage within the latter in the path of an automobile moving toward the place of egress from the garage, and responsive to the passage of the automobile when traveling toward the place of egress, electrical means controlled by the mechanical means and in turn causing the actuation of the danger indicating means to danger indicating position, other mechanical means adapted to be placed in the floor of the garage adjacent to the place of egress and responsive to the passage of the automobile therefrom, and electrical means controlled by the last-named means for causing the restoration of the danger indicating means to the safety condition subsequent to the setting thereof in the danger condition.

14. A warning signal means for garages comprising danger indicating means located in position with respect to the place of emergence from the garage to warn passers-by of the approach of an automobile within the garage toward said place of emergence, and means responsive to the passage of an automobile toward said place of emergence comprising yieldable members set in the floor of the garage in position to be engaged by the wheels of an antomobile, electrical means controlled by the yieldable members for causing the setting of the danger indicating devices into danger indicating condition and to restore said danger indicating devices to normal condition in order by the movement of the automobile toward and through the place of emergence from the garage.

15. An electrically operated warning signal means for garages comprising a semaphore arm movable into and out of danger indicating position, electrically controlled means for causing such movement, an electrically controlled latch means for temporarily holding the semaphore in the danger position, electromechanical means for causing the energization of the electrically controlled means and located in the path of an automobile to respond to the passage thereof, and electro-mechanical means responsive to the passage of the automobile for causing a movement of the latch means to the unlatched position.

16. An electrically operated warning signal means for garages comprising a semaphore arm, a controlling member moving with the arm and provided with conducting and insulating surfaces, brushes engaging said surfaces, a counterweight means tending to move the semaphore arm to the danger position, an electrically operated latch for temporarily holding the semaphore arm in the danger position, an electrically operated weight means for moving the semaphore arm to the safety position, electromechanical means responsive to the passage of an automobile for releasing the semaphore arm to movement to the danger position and for moving the latch to the unlatched position for the restoration of the semaphore arm to the safety position, and electric connections including the controlling member, the brushes and the electrically operated devices.

17. An electrically operated warning signal means for garages comprising a rockable semaphore arm, a controlling member movable therewith and having conducting and insulating surfaces, brushes engaging said surfaces, an electrically operated latch for holding the semaphore arm in the danger indicating position, a solenoid having a core connected to the semaphore and a counter-weight to constrain the semaphore to the safety position, and said semaphore having a normal tendency toward the danger position, yieldable members adapted to be mounted in the floor of the garage with one provided with electric circuit controlling means electrically connected to the solenoid, and another provided with electric circuit controlling means connected to the electrically operated latch means, and another of the yieldable means having lock means associated with the first-named one of the yieldable means for locking the latter against actuation on the passage of an automobile in a direction to first engage the last-mentioned of the yieldable means, and electric connections including the controlling member, the brushes and the electrically operated devices.

18. An electrically operated warning signal means for garages comprising spaced yieldable means adapted to be located in the floor of a garage and yieldable to the passage of an automobile, another yieldable means associated with one of the first-named yieldable means for causing the locking of the latter on the passage of an automobile in one direction, a solenoid provided with a core and electrically connected to one of the first-named yieldable means, an electrically operated latch mechanism controlled by the other of the first-named yieldable means, a semaphore connected to the core of the solenoid and movable by the weight thereof to the safety position, said semaphore having a weight connected thereto to move it to the danger position on the energization of the solenoid, other signal devices, and electrical circuit controlling means operated by the movement of the semaphore for cutting the other signal devices, the solenoid and the electrically operated latch means into and out of circuit.

In testimony, that I claim the foregoing as my own, I have hereto affixed my signature in the presence of two witnesses.

THOMAS D. WARNER.

Witnesses:
DAVID R. WAGNER,
EDITH L. BROWN.